Feb. 18, 1930.　　　W. SEVILLE　　　1,747,883
CROSSBAR AND OPEN WEAVE LOOM
Filed Aug. 6, 1927　　　7 Sheets-Sheet 2
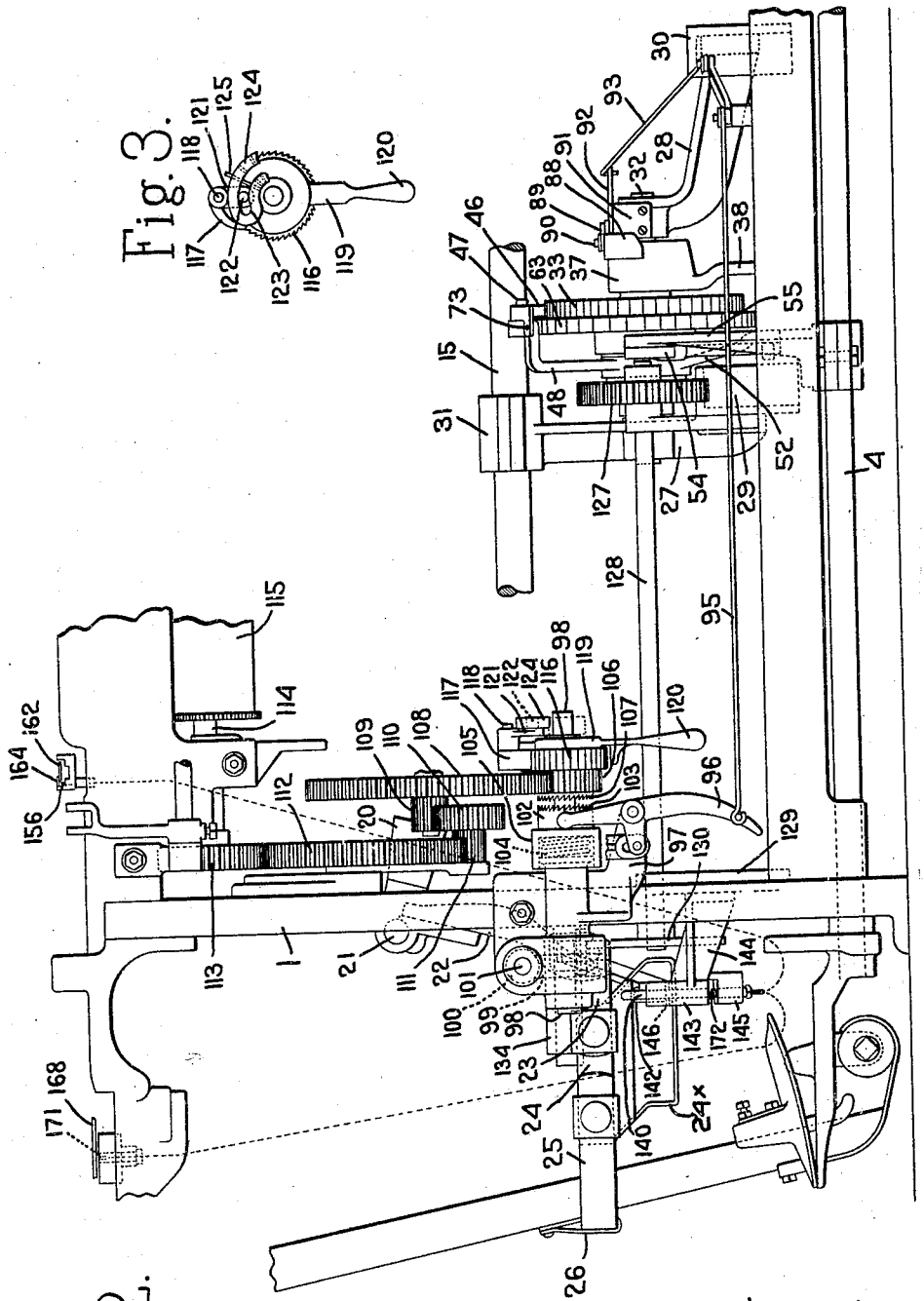
Inventor.
William Seville
by Heard Smith & Tennant
Attys.

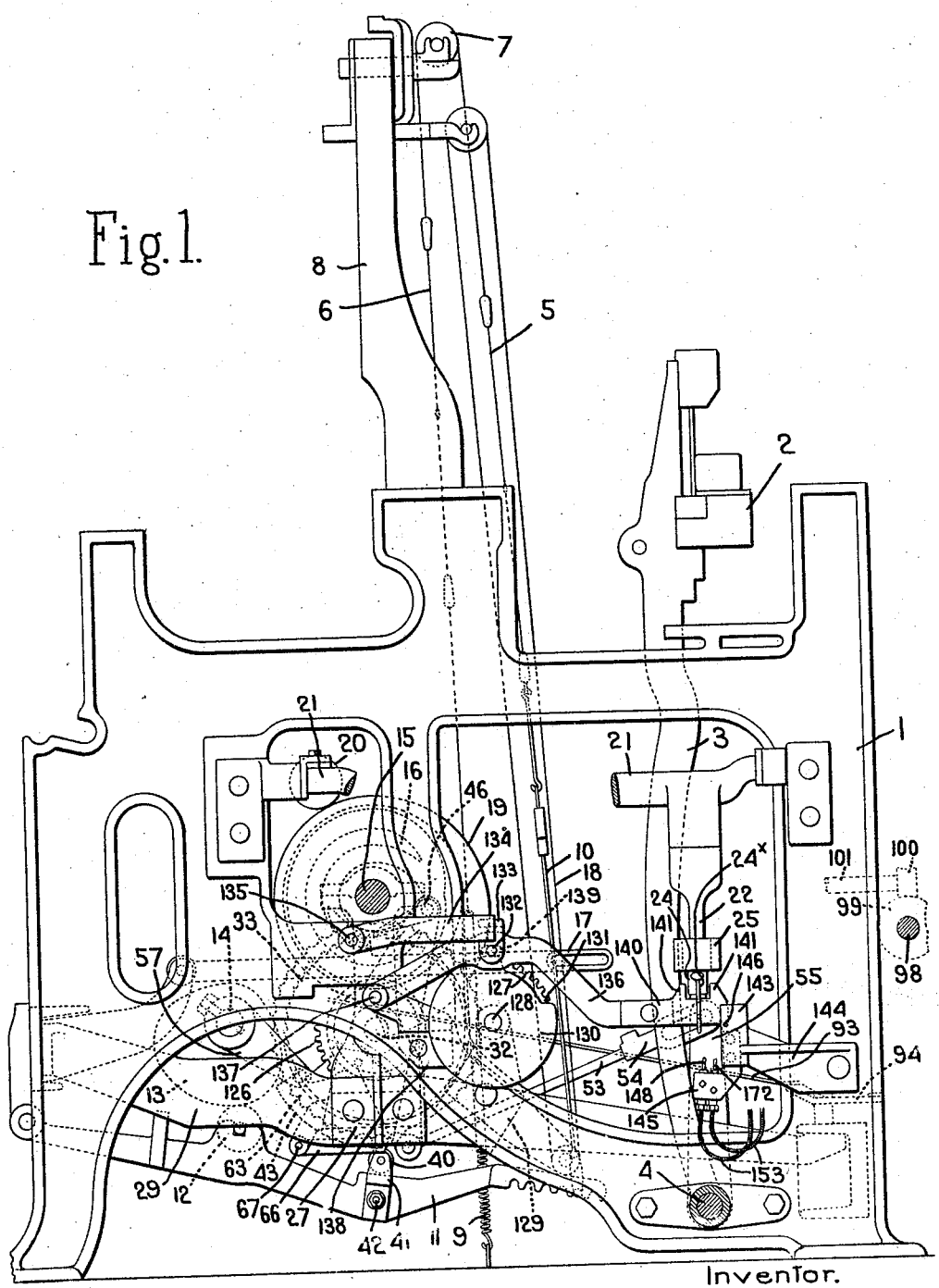

Feb. 18, 1930. W. SEVILLE 1,747,883
CROSSBAR AND OPEN WEAVE LOOM
Filed Aug. 6, 1927 7 Sheets-Sheet 3

Inventor.
William Seville
by Howard Smith & Tennant.
Attys.

Inventor.
William Seville
by Heard Smith & Tennant.
Attys.

Feb. 18, 1930.  W. SEVILLE  1,747,883
CROSSBAR AND OPEN WEAVE LOOM
Filed Aug. 6, 1927   7 Sheets-Sheet 5

Inventor.
William Seville
by Heard Smith & Tennant.
Attys.

Inventor.
William Seville
by Heard Smith & Tennant.
Attys.

Feb. 18, 1930.  W. SEVILLE  1,747,883
CROSSBAR AND OPEN WEAVE LOOM
Filed Aug. 6, 1927   7 Sheets-Sheet 7

Inventor.
William Seville
by Heard Smith & Tennant
Attys.

Patented Feb. 18, 1930

1,747,883

UNITED STATES PATENT OFFICE

WILLIAM SEVILLE, OF HOPEDALE, MASSACHUSETTS, ASSIGNOR TO DRAPER CORPORATION, OF HOPEDALE, MASSACHUSETTS, A CORPORATION OF MAINE

CROSSBAR AND OPEN-WEAVE LOOM

Application filed August 6, 1927. Serial No. 211,033.

This invention relates to improvements in looms having weaving mechanism acting normally to produce a fabric having a predetermined weave, and the object thereof is to provide novel mechanism for producing in said fabric either thick stripes formed by accumulated weft and thin stripes formed by the omission of weft or both thick and thin stripes.

A further object of the invention is to provide means for varying the relative arrangement of the thick and thin stripes in the web of fabric.

Another object of the invention is to provide means for varying the number of accumulated weft threads producing thick stripes.

Another object of the invention is to provide means for varying the density of the thick stripes.

A further object of the invention is to provide a construction selectively operable to produce in the fabric having a normal predetermined weave thick stripes and thin stripes with means selectively operable to cause the omission of either the thick stripe or the thin stripe or both.

A further object of the invention is to provide controlling mechanism which can be applied readily to a usual type of loom without material modification of the normal structure to produce different fabrics of the character above specified.

More particularly an object of the invention is to provide a loom having a harness, a harness lever and a harness lever actuating cam with controlling means having a hold-down operable in timed relation to the harness lever actuating cam to engage the harness lever at a limit of its movement and to retain the same inactive with the shed in open position at predetermined intervals and for predetermined periods for the purpose of producing a thick stripe of accumulated weft.

A further object of the invention is to provide the controlling mechanism with adjustable means whereby the number of accumulated threads forming the thick stripe may be varied.

A further object of the invention is to provide means for varying the density of the thick stripe, this desirably being accomplished by providing a let-back mechanism operable by said controller to let back the take-up roll upon the production of a thick stripe.

A further object of the invention is to provide mechanism subject to the action of said controller for disengaging at predetermined intervals and for predetermined periods a connection between the picker stick and its actuating mechanism.

A further object of the invention is to provide means for preventing effective action of the controller upon the harness levers whereby the production of thick stripes may be omitted.

A further object of the invention is to provide means for rendering inoperative the mechanism for interrupting the action of the picker stick.

A further object of the invention is to provide means for eliminating the action of the controller thus enabling the loom to produce a web of fabric having a predetermined normal weave.

Another object of the invention is to provide means for preventing overthrow or excessive movement of the controller.

Another object of the invention is to provide means for varying the frequency of the cycles of the controller mechanism and thereby to vary the width of the normal weave and the thick and thin stripes.

Other objects and features of the invention will more fully appear from the following description and accompanying drawings and will be particularly pointed out in the claims.

Inasmuch as the invention is applicable to usual types of looms, the general structure of which is well known, only such portions of the loom are illustrated herein as are necessary to illustrate the embodiment of the invention.

In the drawings:

Fig. 1 is a side elevation of a loom showing the mechanism embodying the present invention applied thereto.

Fig. 2 is a front view of a portion of the loom embodying the present invention.

Fig. 3 is a detail view of the detent mechanism of the let-back.

Figure 4:
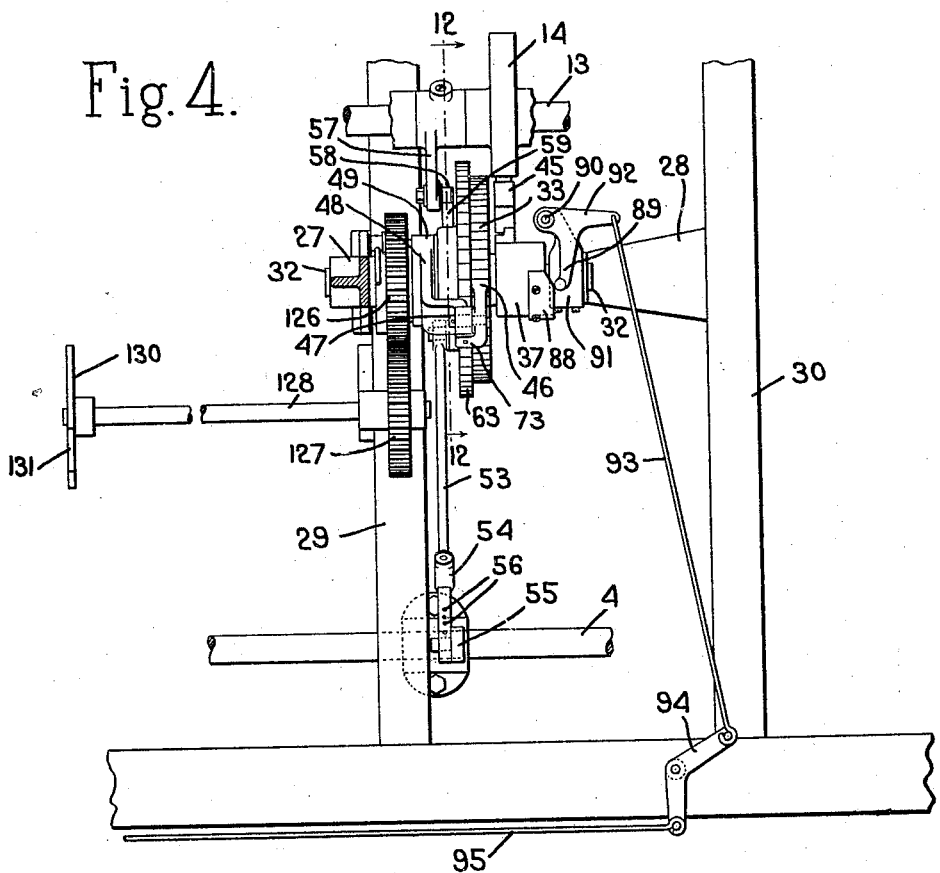
Fig. 4 is a detail view in plan of portions of the novel mechanism embodying the invention.

The present invention is illustrated herein as applied to a plain loom of the usual Northrop type, but it will be understood that the invention may be embodied in any other type of loom to which it is applicable and that such modifications of structure may be employed as will adapt it to the particular loom.

The invention in general comprises mechanism for enabling a loom having weaving mechanism for producing a fabric having a predetermined weave to embody in said fabric thick stripes formed of accumulated weft, or thin stripes produced by the omission of weft, either alone or in predetermined sequence with respect to the normal weave and with respect to each other.

The controlling mechanism is such that the thick stripe producing mechanism or the thin stripe producing mechanism may be rendered inoperative or the controlling mechanism as a whole rendered inoperative.

The invention is primarily designed to provide a plain loom, having usual cam operated shedding mechanism, for producing a fabric having a predetermined weave, with means selectively operable to produce in said fabric either thin stripes, by the omission of weft, or thick stripes, by accumulation of weft, or both thick and thin stripes in any desired sequence. Inasmuch as plain looms having cam operated shedding mechanism are usually operated at a much higher speed than dobby or pattern looms, the advantage of the present invention in producing striped fabrics of the character described is obvious.

The particular embodiment of the invention illustrated herein is applied to a plain loom of the Northrop type having the usual loom side 1, the lay 2 carried by the sword 3 which is mounted at its lower end upon the usual rock shaft 4 and other mechanisms common to this type, many of which are not illustrated. The shed-forming mechanism comprises a harness having the usual front and rear heddle frames 5 and 6 which are connected by flexible straps to a roll 7 mounted upon a standard 8 extending upwardly from the loom side, the lower end of the rear heddle frame 6 being connected by a suitable strap to a spring 9 anchored at the base of the loom, while the front heddle frame 5 is connected to a link 10 having at its lower end a stirrup adapted to engage any one of a series of notches in the end portion of a harness lever 11 which is pivotally mounted upon a bracket secured to one of the longitudinal girders of the loom frame.

The harness lever 11 is provided with a follower roll 12 which is engaged and actuated by a harness cam 13 mounted upon the usual auxiliary or harness cam shaft 14 which is driven by suitable gears from the main cam shaft 15 of the loom.

A selvage cam 16 is mounted upon the cam shaft 15 and engages a follower upon the selvage motion lever 17 which actuates the harness strap 18 of a usual type of selvage mechanism. A cam 19 also mounted upon the cam shaft 15 engages the pick ball or cone 20 upon the arm of the pick shaft 21 which has a picker stick actuating arm 22 which in the present construction is disengageably connected to a lug strap 23 forming part of the connector, the opposite end of which engages the picker stick. In the preferred form of connector which is illustrated herein, the lug strap 23 is secured to a preferably wooden block 24 which presents a smooth lower face and to the opposite end of which a lug strap 25 is connected which embraces the picker stick and is secured thereto by the usual supporting strap 26. Means forming part of the present invention permit the engagement and disengagement of the connector with the picker stick actuating mechanism to produce thin stripes in the fabric by the omission of weft as will hereinafter more fully appear.

The action of the disengageable connector is controlled in the mechanism illustrated herein by the same controlling mechanism which controls the operation of the shed-forming mechanism to produce thick stripes of accumulated weft threads. This controlling mechanism is in the form of a controller unit which may be applied to a usual loom without material modification of the structure or mechanism of the loom.

The controller mechanism comprises brackets 27 and 28 which are secured at their ends respectively to intermediate cross girders 29 and 30 of the loom frame, the bracket 27 desirably being extended upwardly and having at its upper end a bearing 31 which embraces the cam shaft 15. The brackets 27 and 28 are provided with bearings in which a short stud shaft 32 is fixedly mounted. A controller is rotatably mounted upon the stud shaft 32 and comprises a ratchet disk 33 having a large hub portion 34 and smaller hub portions 35 and 36 extending from opposite sides thereof. Means are provided for rotating the controller in timed relation to the rotation of the auxiliary or harness cam shaft and the controller is provided with a hold-down adapted to engage the harness lever at a limit of its movement and retain the harness lever in inactive position with the harnesses holding the shed open during a predetermined number of picks to produce an accumuation of weft threads forming a thick stripe.

Figure 13:
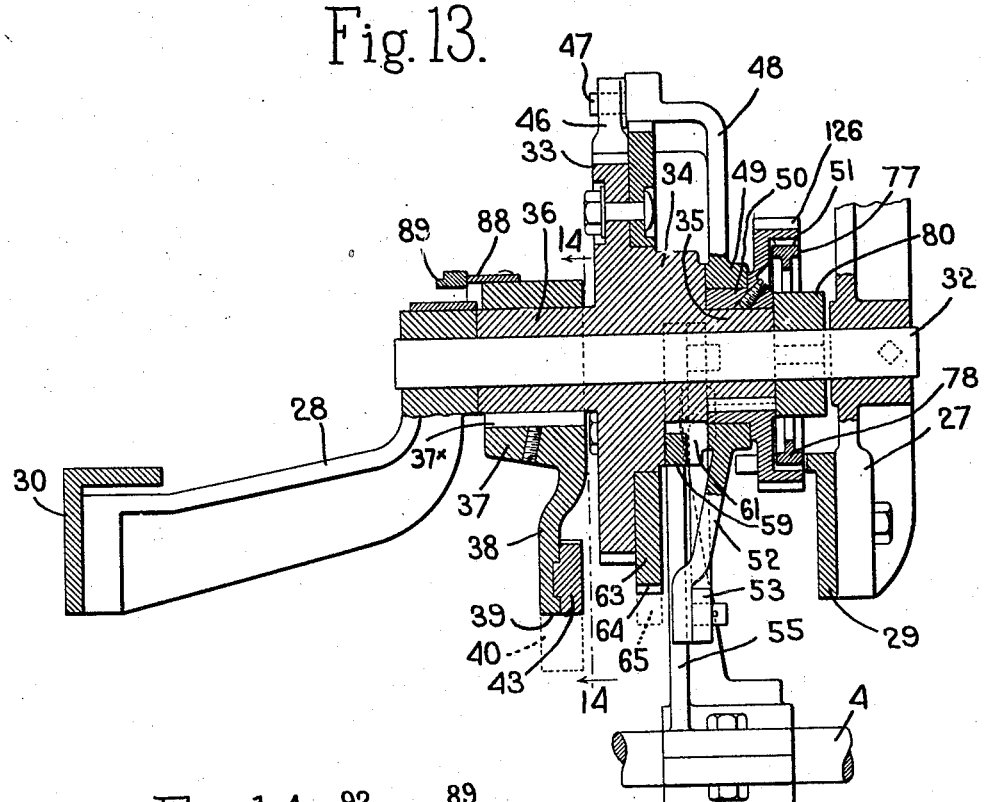
Fig. 13 is a detail longitudinal sectional view of the controller mechanism.
Figure 14:
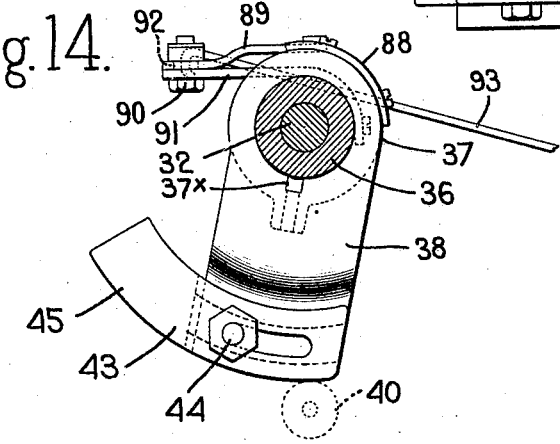
Fig. 14 is a detail sectional view on line 14—14 of Fig. 13 illustrating particularly the adjustable hold-down for the harness lever.

In the construction illustrated herein, see particularly Fig. 13, the hold-down is adjustably secured to the section 36 of the hub of the controller. This desirably may be accomplished by providing a key 37ˣ having a concave face engaging the periphery of the hub section 36, the concave face of the key being of shorter radius than that of the hub section 36, thus presenting edges which are forced into biting engagement with the hub 36 by a screw seated in the hub 37 of the hold-down and abutting against the opposite edge of the key. An offset arm 38 extends from the hub 37 and presents at its lower end an arcuate face 39 adapted to engage a roller 40 which is carried by a bracket 41 which is pivotally connected by a bolt 42 to the harness lever and forms a part of the harness lever. When therefore the hold-down engages the roller 40 of the harness lever when the harness lever is at the lower limit of its stroke, as illustrated in Fig. 1, the harness lever is prevented from rising, thereby holding the harness in such a position that the shed remains open.

In order to continue the action of the hold-down for the period required to permit the accumulation of a desired number of weft threads, the arm 38 has secured to its lower end portion an arcuate shoe 43 having a relatively thin portion provided with a slot and which is secured by a bolt 44 extending through said slot to the arm 38. Suitable guiding means for the adjustable shoe are provided, such as an arcuate groove in the face of the arm 38 which is concentric with the arcuate face 39 thereof and the complementary rib upon the juxtaposed face of the shoe 43 slidably fitting in said groove. A portion 45 of the shoe 43 beyond the lever arm 38 is made thicker to present a continuation of the curved follower engaging portion of the hold-down of the same thickness as the combined thickness of the end of the arm 38 and the thinner portion of the shoe 43. The ratchet disk 33 of the controller is engaged by a pawl 46 which is pivotally mounted upon a stud 47 upon the offset end portion of an arm 48 of a pawl-actuating lever, the hub 49 of which is rotatably mounted upon the hub 50 of a brake drum 51 which is keyed to the reduced portion 35 of the hub of the controller. Desirably also a set screw passing obliquely through the hub 50 of the brake drum and which engages the hub 35 is provided to prevent endwise movement of the hub 50 of the brake drum upon the reduced portion 35 of the hub of the controller. The other arm 52 of the pawl actuating lever is pivotally connected to one end of a link 53, the opposite end of which is secured to a slotted member 54 which engages a stud upon the upper end of an arm 55, the lower end of which is secured to the lay rock shaft 4. The slotted member 54 is provided with a series of pin holes 56 to receive a pin adapted to limit the movement of the stud upon the arm 55 in the slot, thereby controlling the amount of lost motion of said stud and consequently permitting the adjustment of the throw of the controller actuating pawl.

By reason of the usual timed relation of the lay rock shaft, the crank shaft, the cam shaft and the auxiliary or harness cam shaft, the rotation of the controller is synchronized with the rotation of the auxiliary or harness cam shaft of the loom so that the hold-down may be rotated to a position, or in proximity to a position, operatively to engage the roller 40 of the harness lever at the time the harness lever is depressed to the lower limit of its movement by the harness cam. In order, however, to insure the engagement of the hold-down with the roller of the harness lever when the harness lever is at the lower limit of its movement, special mechanism is provided to advance the hold-down into such engagement when the harness lever is at the lower limit of its movement. This mechanism comprises an arm 57 which is keyed upon the auxiliary or harness cam shaft 14 and has adjustably mounted in a slot near its end a stud 58, which desirably has an antifriction roller upon it adapted to engage a lever 59 (see Fig. 12) which is mounted upon a stud 60 in a recessed portion 61 of the hub of the controller. The end of the lever 59 engages the base of the recess and desirably is normally held in such engagement by a spring-pressed pin 62. The free end portion of the lever 59 is tapered to present a narrow or rounded end. This construction is such that if by chance the stud 58 should engage the end of the lever 59 when said arm and lever are in substantial alignment, the lever 59 may yield sufficiently to slip over the stud and thereby avoid the smash which otherwise would occur.

By the adjustment of the stud 58 in the slot of the lever 57 the effective length of the arm 57 may be varied to cause the arm to give a greater or less throw to the lever 59, thereby enabling the extent of the advancing movement of the controller to be varied. By such adjustment the width of the stripe of normal weave between the thick stripes, or between the thin stripes, may be varied.

The slot in the lever 57 may also be of sufficient length to enable the stud 58 to be drawn toward the shaft 14 sufficiently to avoid engagement of the stud 58 with the lever 59. When the stud 58 is so adjusted as not to engage the lever 59, and the bracket 41 of the harness lever 11 is swung to the inoperative position, (shown in Fig. 11,) so that its roll 40 will not engage the hold-down, the mechanism for producing a thick stripe will be rendered inoperative. The controller will then be rotated uniformly by its pawl and ratchet mechanism, and will be adapted to produce a maximum width of normal weave between thin stripes which may be produced by mechanism hereinafter to be described.

Figure 12:
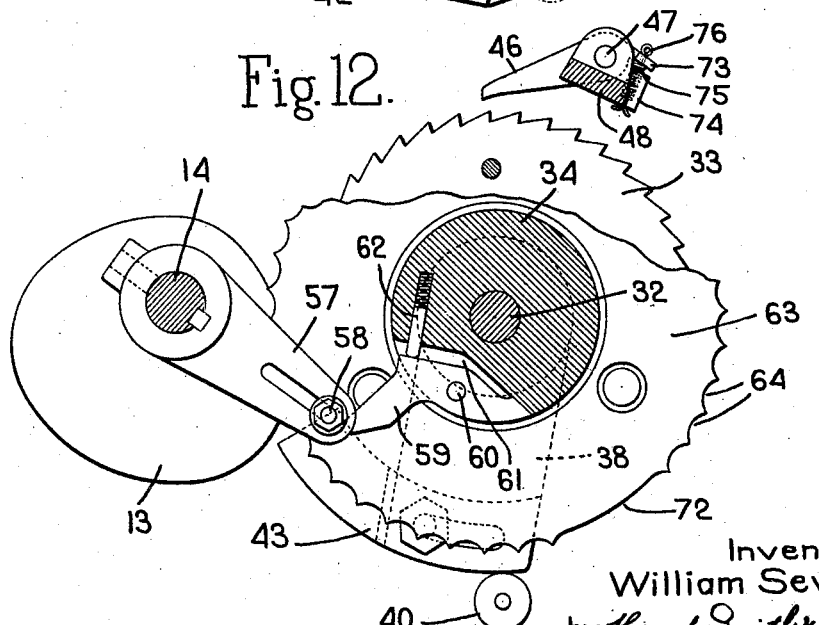
Fig. 12 is a detail sectional view on line 12—12 of Fig. 4 illustrating the manner in which the pawl which actuates the controller may be disengaged therefrom to render the controller inoperative.

If the pawl 46 is also held in inoperative position by the cotter pin 76 (as shown in Fig. 12), the controller mechanism will be rendered wholly inoperative, so that a plain weave may be continuously produced in a manner which will hereinafter be explained.

Figure 15:
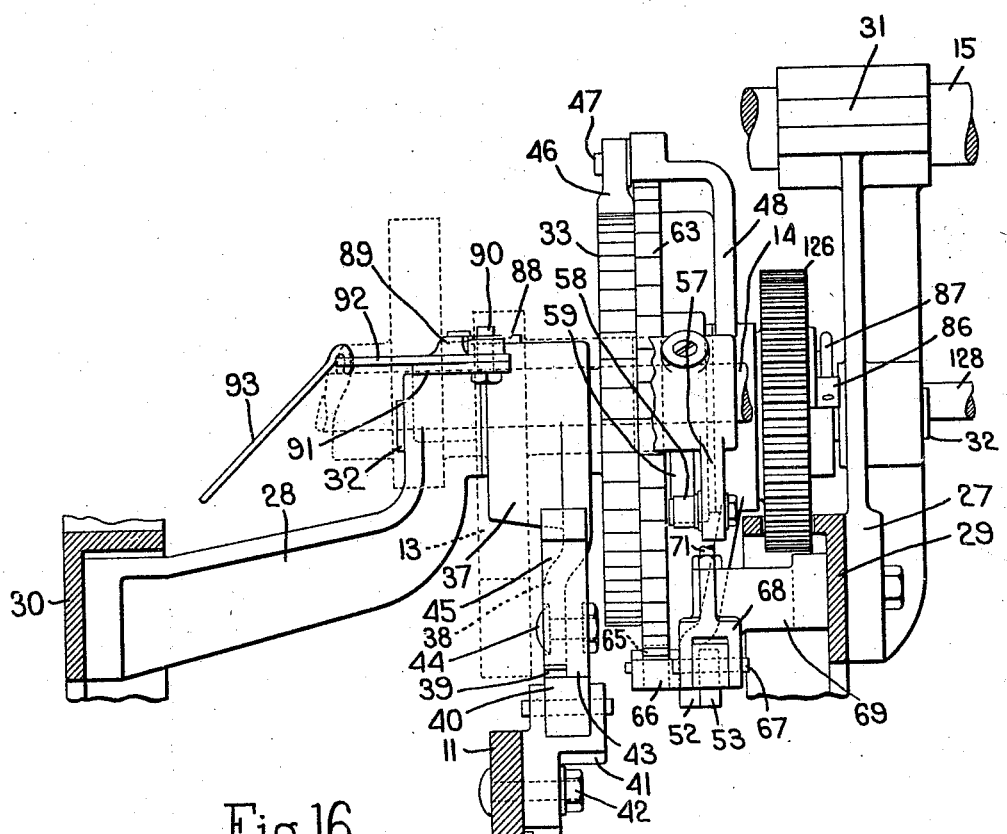
Fig. 15 is a rear elevation showing the manner in which the controller unit is mounted upon the intermediate girders of the loom which are shown in section.
Figure 16:
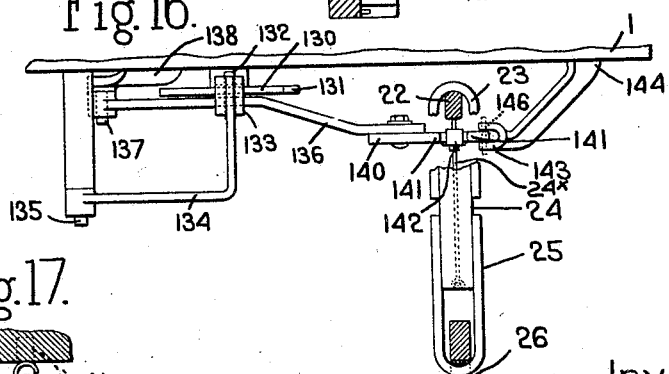
Fig. 16 is a detail plan view of the mechanism for rendering the picker stick actuating mechanism inoperative.
Figure 17:
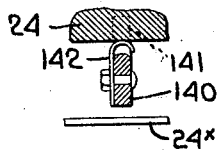
Fig. 17 is a detail vertical sectional view of part of the connector actuating mechanism.

Desirably means are provided for insuring proper rotation of the controller and for preventing overthrow when the controller is advanced by the engagement of the stud 58 on the arm 57 with the lever 59. In the present construction a positioning mechanism for insuring proper rotation of the disk and a brake mechanism are provided. The positioning mechanism comprises a disk 63, which is preferably adjustably bolted to the ratchet disk 33 of the controller. The periphery of the disk 63 is provided with recesses preferably in the form of scallops 64 which are engaged by a roller 65 (see Fig. 11) upon the free end of an arm 66, the opposite end of which is mounted upon the pin 67 extending through the bifurcated end 68 of a bracket 69 which is mounted upon the intermediate girder 29 (see Figs. 11 and 15). The roller 65 is held in engagement with the recessed periphery of the positioning disk 63 by a helical spring 70 which is secured at its lower end to a lug extending upwardly from the arm 66 and is secured at its upper end to an L-shaped arm 71 extending upwardly from the bracket 69.

The recesses or scallops are omitted from the portion of the recessed periphery of the disk 63 to provide a plain surface 72 to be engaged by the roller 65 when the controller is rotated by the engagement of the arm 57 with the lever 59 thereby permitting free rotation of the controller during such engagement. The recesses or scallops 64 of the positioning disk are complementary with, and correspond to, the teeth of the ratchet wheel so that as the ratchet is actuated by its pawl, the engagement of the roller 65 with the recesses of the positioning disk will prevent reverse rotation of the disk and insure the proper timing of the rotation of the controller.

Desirably means are provided for throwing the controller mechanism entirely out of operation to enable the loom to produce its predetermined normal weave. This is conveniently accomplished by providing means for locking the pawl 46 out of engagement with the teeth of the controller ratchet.

In the construction illustrated herein, the pawl 46 is provided with a tail 73 which extends over a boss 74 upon the end portion of the arm 48 of the pawl actuating lever. A helical spring 75 seated in a socket in the boss 74 engages the under face of the tail 73 of the pawl and normally holds the pawl in engagement with the teeth of the ratchet. Desirably aligned holes are provided in the tail 73 and in the boss 74 which will permit the insertion of a cotter pin 76 through the tail 73 and the boss 74 and axially through the coiled spring 75. By spreading the legs of the cotter pin when the same has been inserted and the pawl raised out of engagement with the ratchet, the pawl will be retained out of operative position and rotation of the controller thereby prevented. Thus the entire controlling mechanism is rendered inactive.

Figure 11:
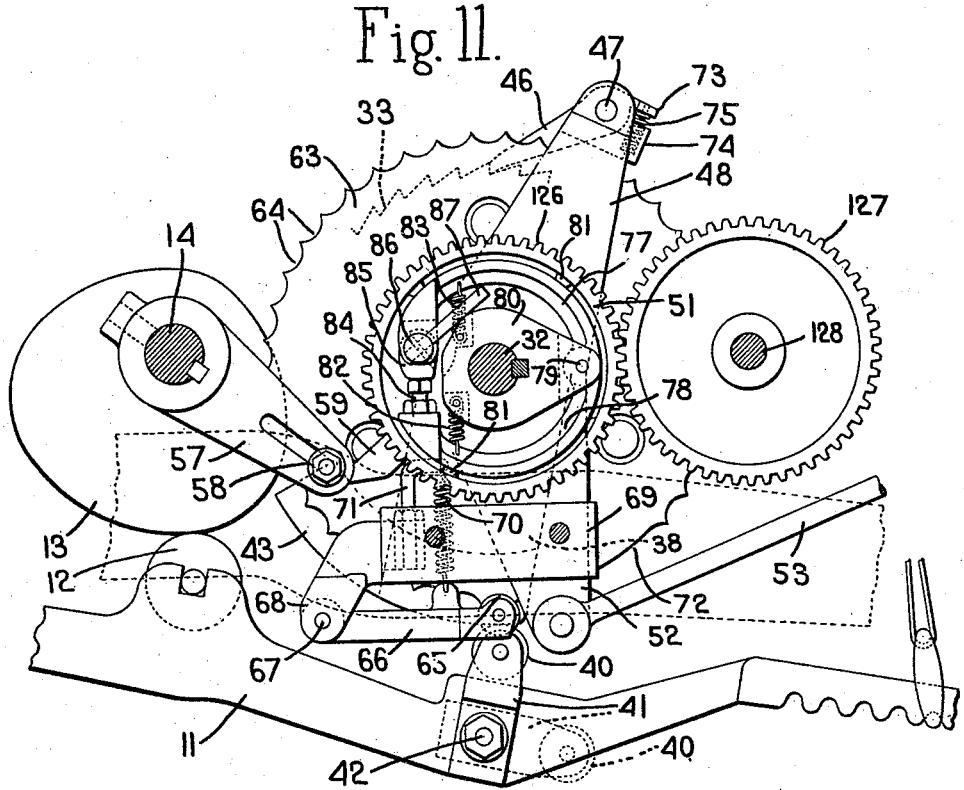
Fig. 11 is an enlarged detail side elevation of the novel mechanism showing particularly the manner in which the controller holds down the harness lever.

The braking mechanism for preventing overthrow comprises brake shoes 77 and 78 which are pivotally mounted upon a stud 79 at the end of an arm 80 which is located within the brake drum 51 and is secured by a key to the stud shaft 32. These brake shoes are provided with suitable friction members 81 to engage the inner face of the brake drum. Springs 82 and 83 connected to the brake shoes 77 and 78 and to pins in recessed portions of the arm 80 normally tend to withdraw the brake shoes from engagement with the drum. Adjustable means are provided for forcing the brake shoes into engagement with the face of the brake drum against the opposition of the springs 82 and 83 and also means are preferably provided to permit the manual release of the brake shoes from the drum in order to permit easy adjustment or manual rotation of the controller mechanism. In the construction shown the brake shoe 78 is provided with an enlarged portion in which an adjusting screw 84 is seated and provided with a lock nut. The head of the adjusting screw engages a flattened face of the cam 85 secured to a stud 86 in an enlarged end portion of the brake shoe 77. The stud 86 has connected to it a lever 87 which normally rests upon the surface of the brake arm 80, as illustrated in Fig. 11, in which position the cam 85 engages the end of the adjusting screw 84 and maintains the brake shoes in braking position. When it is desired to release the brake, the lever 87 is rotated in a counter-clockwise direction, thereby disengaging the cam 85 from the head of the adjusting screw and permitting the springs 82 and 83 to release the brake shoes from engagement with the drum.

In the normal operation of the controller, however, the brake shoes are continuously in engagement with the brake drum and act to prevent overthrow when the arm 57 on the auxiliary or harness cam shaft engages and actuates the lever 59 to rotate the controller and advance the hold-down into engagement with the roller 40 of the harness lever.

By virtue of the construction herein described, therefore, the rotation of the controller causes the hold-down to engage the roller of the harness lever and render the harness lever inactive, thus holding the shed open during a predetermined number of picks of the shuttle, thereby accumulating a number of weft threads in the open shed. By adjusting the position of the shoe 43 upon the hold-down arm 38, the time in which the hold-down operates upon the harness lever can be varied so that a desired number of weft threads may be accumulated before the normal operation of the weaving mechanism is resumed. Thus the amount of material forming the thick stripe may be varied.

Desirably means are provided also for varying the density or massing of the threads forming the thick stripe and this is accomplished by providing a let-back mechanism operating in conjunction with the hold-down mechanism. To accomplish this purpose the hub 37 of the hold-down has secured to it a cam 88 (see Figs. 2, 4, 13, 14 and 15) which engages a stud upon the end of an arm 89 of a bell crank lever which is pivotally mounted upon a stud 90 extending upwardly from a bracket 91 which is secured to the controller supporting bracket 28, the other arm 92 of the bell crank lever being connected by a link 93 to a bell crank lever 94 which in turn is connected by a link 95 to a clutch releasing lever 96 which controls the take-up mechanism of the loom. In the construction shown in Fig. 2, the clutch actuating lever 96 is pivotally mounted on a stud projecting from a bracket 97 which is secured to the loom side and in which a short shaft 98 is journalled which is provided with a worm gear 99 driven by a worm 100 on a shaft 101 having at its opposite end a bevelled gear, not shown, which engages a complementary bevelled gear upon the cam shaft of the loom. The shaft 98 has slidably feathered to it a clutch member 102 having a clutch face 103 which is normally forced to engaging position by a helical spring 104 mounted in a chambered member 105 which is mounted upon the shaft 98 and abuts against a boss upon the bracket 97 through which the shaft 98 extends. A gear 106 is rotatably mounted upon the shaft 98 and is provided with a clutch face 107 complementary to the face of the clutch member 102. The gear 106 drives a train of gears 108, 109, 110, 111, 112, which in turn drives the gear 113 upon the shaft 114 of the take-up or sand roll 115, this train of gears being those of the usual take-up mechanism. The gear 106 has secured to it or formed integral with it a ratchet disk 116 which is engaged by a detent pawl 117 which is pivotally mounted upon a stud 118 at the end of the lever 119 which is fulcrumed upon the shaft 98 and is provided with a downwardly extending weighted handle 120 which normally tends to hold the lever 119 in vertical position. From the upper end of the lever 119 an arm 121 extends downwardly and is provided with a laterally extending stud 122 which enters an arcuate slot 123 of an arm 124 which extends from the take-up stand. The arm 124 is provided with a series of pin holes extending therethrough radially of the curvature of the arm selectively to receive a pin 125 to limit the movement of the stud 122 and thereby determine the amount of let-back of the take-up roll. By reason of this construction the thickness or density of the thick stripe may be controlled as the amount of let-back determines the position of the edge of the fell relatively to the limit of movement of the lay so that the closer the edge of the fell lies to the lay, the greater will be the effect of the beat-up upon the accumulated warp threads and the massing or condensation thereof will be increased.

As before stated, the controller is also employed to actuate the mechanism for interrupting the action of the picker stick to produce thin stripes in the fabric.

In the construction illustrated herein, the brake drum is provided with a toothed periphery 126 which engages the complementary teeth upon a gear 127 which is fixedly secured to a shaft 128 extending lengthwise of the loom and journalled in suitable bearings on the cross girder 29 and in a bracket 129 which is secured to the loom side. A cam 130, which is adjustably and detachably secured to the shaft 128 and is located beyond the loom side, controls the mechanism for interrupting the action of the picker stick to produce thin stripes. In the construction illustrated, the cam 130 is provided with a recess 131 in its periphery and the periphery of the cam engages a stud 132 carried by the bifurcated end 133 of a lever 134 which is pivotally mounted on a stud 135 extending outwardly from the loom side. A connector controlling lever 136 is pivotally mounted upon a stud 137 which projects from a bracket 138 which is secured to the loom side. This lever extends upwardly and then downwardly and horizontally and the central portion of the upwardly bent section has a slot 139 which receives the stud 132 which engages the periphery of the cam. When, therefore, the stud 132 enters the recess of the cam, the lever 136 is permitted to descend. The horizontal portion of the lever 136 has secured to it an extension 140 having upwardly extending lugs 141 which lie upon opposite sides of the connector block 24. A leaf spring 142 which is secured to the lever 140 is provided with an arcuate upper face which engages the smooth under face of the block 24 of the connector. When the stud 132 engages the circular periphery of the cam 130, the lever 136 is held in raised position, thereby maintaining the connector in engagement with the picker stick actuating arm 22, as shown in Fig. 1. When during the rotation of the cam 130 the stud 132 enters the recess 131 in said cam, the lever 136 is permitted to descend sufficiently to permit the connector to clear the end of the picker stick actuating arm 22, thereby interrupting the action of the picker stick. A guard 24*, which is secured to the block 24 of the connector, extends beneath the lever 136 in such position that when the lever 136 is depressed it will be engaged thereby and the connector positively drawn out of engagement with the connector-actuating mechanism. While the picker stick remains inactive after such disengagement, the lay continues its reciprocation, and the take-up continues its movement, so that the web of cloth is advanced without the introduction of weft during the depression of the connector, thereby producing a thin stripe in the fabric. The end of the extension 140 projects into a guideway 143 in a bracket 144 which is secured to the loom side. Thus the lever 136 is prevented from lateral vibration. The guard 24*, which is attached to the connector block 24, serves to prevent the connector block from being thrown out of the recess between the lugs 141 on the extension 140 of the lever 136. It also serves to prevent the extension 140 of the lever 136 from being thrown out of the guideway 143. Thus the connector is held against both lateral and transverse misalignment.

The walls of the guideway 143 are provided near their upper ends with aligned pin holes 146 which are located in such a position that a pin may be inserted therein across the guideway to hold the controller lever 136 in its uppermost position, so that disengagement of the connector from the picker stick actuating mechanism will be prevented and the production of the thin stripe thereby avoided.

Thus by merely introducing a pin in the pin holes 146 the controller mechanism may be readily set to weave continuously a fabric having a body of normal weave with thick stripes therein at predetermined intervals.

Inasmuch as the omission of weft would normally cause the operation of the usual weft fork to effect a change in the operation of the loom, means are provided to render the weft fork inoperative during the production of the thin stripe. Desirably means are also provided to prevent the action of the feeler during the production of the thin stripe, the shuttle at this time being in the box at the side of the loom at which the picker stick is inactive, and if transfer should be called for at such time, no shuttle would be present under the battery of the loom. In the constructions illustrated herein, both of these mechanisms are illustrated and comprise push wire devices which are positioned to be engaged by the extension 140 of the lever 136 which actuates the connector.

Figure 20:
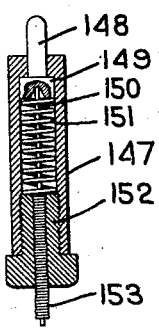
Fig. 20 is a vertical sectional detail view showing one of the push wire units which is operated by the picker stick controlling mechanism during the production of a thin stripe.

The plunger mechanisms for the push wires may be, and desirably are identical and the description in detail of the weft fork actuating mechanism is applicable to both. This mechanism comprises a cylindrical casing 147 (see Fig. 20) which is mounted in the extension 145 of the bracket 144. The plunger 148 extends through the upper end of the cylindrical casing and is provided with a shouldered head 149 which engages the upper end of the cylinder 147. The head 149 of the plunger engages the end of the push wire 150. The plunger is normally held in raised position by a helical spring 151, the upper end of which engages the under face of the head 149 and the lower end of which engages a screw-threaded plug 152 which also acts as a bushing for the spiral metallic sheath 153 of the push wire. The opposite or upper end of the push wire extends into a similar cylinder 154 having at its lower end a plug 155 which receives and forms a bushing for the metallic sheath 153 of the push wire. The plunger 156 at this end of the push wire is provided with a head 157 which engages the end of the push wire and is normally held in engagement with the plug 155 by a helical spring 158 interposed between the head 157 and the under face of the upper wall of the cylinder 154. When, therefore, the plunger 148 is engaged by the extension 140 of the lever 136, when the lever is at its lowest position, the plunger 148 will be depressed, thereby raising the plunger 156 which controls the weft fork.

The weft fork mechanism may be, and as illustrated herein is, of a usual type comprising a slide 159 having pivotally mounted therein a block 160 provided with the usual weft fork tines 161 and loop 162 which is adapted upon detection of absence or failure of filling to be engaged by the usual hook 163 upon the weft hammer. Upon such engagement, the slide is moved forwardly, thereby actuating the controller rod to effect a change in the operation of the loom.

In the present construction the loop 162 of the weft fork is provided with a laterally extending ear 164 which lies directly above the plunger 156 of the push wire. When, therefore, the arm 136 descends and engages the plunger 148 at the lower end of the push wire, the plunger 156 will be projected upwardly, thereby raising the loop of the weft fork so that the tail of the fork cannot be engaged by the weft hammer. By reason of this construction an undesirable stoppage of the operation of the loom, which might be caused by the beating of the last pick of filling after the interruption of the picker stick into the grid a sufficient distance to simulate absence of filling, will be avoided.

Figure 18:
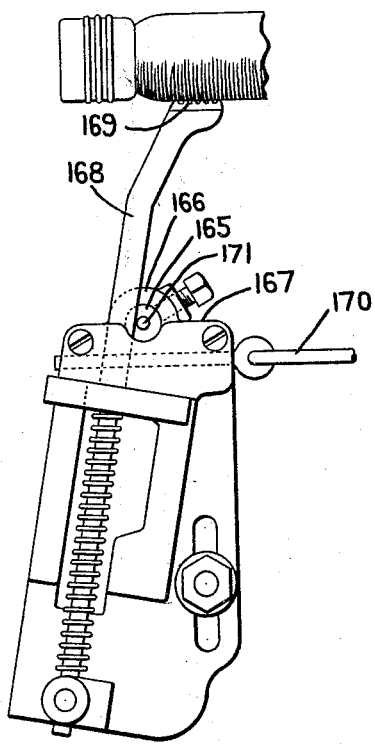
Fig. 18 is a plan view illustrating a type of side motion feeler and means for arresting the movement thereof during the production of a thin stripe.
Figure 19:
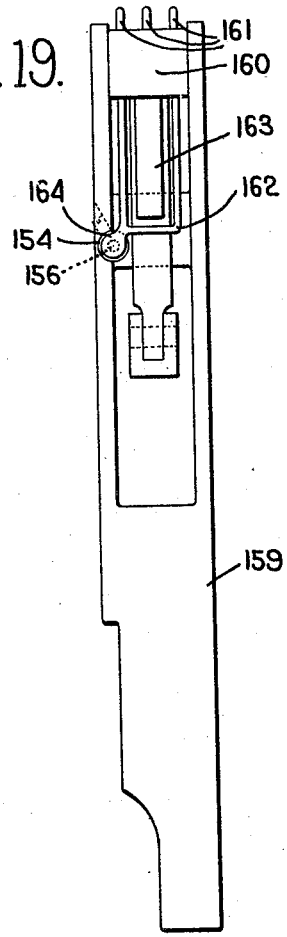
Fig. 19 is a plan view of the weft fork mechanism showing the means for rendering the same inoperative during the production of a thin stripe.
Figure 21:
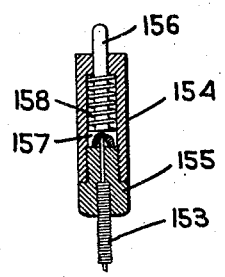
Fig. 21 is a vertical sectional view of a cooperating push wire unit adapted to render the feeler or the weft fork inoperative during the production of a thin stripe.

The mechanism for rendering the feeler inoperative during the production of a thin stripe is, as before stated, actuated by similar mechanism. In this construction a cylinder 165 (see Fig. 18) which corresponds to the cylinder 154 (Fig. 21) is secured in a boss 166 upon the usual feeler stand 167 of the feeler, which, as illustrated herein, is of the well known side slip type. In this construction the feeler 168 is provided with a serrated end 169 which engages the filling on the bobbin and is prevented thereby from lateral movement upon the beat-up of the lay during the normal operation of the loom. Upon substantial exhaustion of filling upon the bobbin, however, the serrated end 169 of the feeler slips sidewise (to the right) thereby actuating a connector 170 which in turn actuates mechanism to effect a change in the operation of the loom. The plunger 171 which is mounted in the cylinder 165, and corresponds to the plunger 156 illustrated in Fig. 21, is so positioned that it may be projected into the path of the feeler 168 and thereby prevent side motion thereof. The plunger 171 is actuated through a push wire from a plunger 172, which corresponds in construction to the plunger 148, and is likewise mounted in the extension 145 of the bracket 144 and is located in the path of the lever 136 so that it is engaged thereby and actuated upon the depression of the lever 136. Thus both the weft fork mechanism and the feeler mechanism are rendered inoperative so that a change in the operation of the loom by these detector mechanisms is prevented during the production of a thin stripe.

Figure 5:
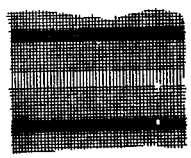
Figs. 5, 6, 7, 8 and 9 illustrate some of the different forms of weaving which can be produced by the mechanism embodying the invention.
Figure 6:
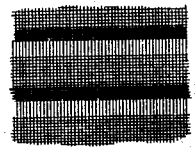

From the foregoing description it will be obvious that the mechanisms forming the present invention may be embodied in a loom of a usual type adapted to produce a fabric having a predetermined normal weave. When all of the mechanisms embodying the invention are in operative position, thick and thin stripes will be embodied alternately in the normal weave, as the hold-down of the rotary controller will periodically engage the harness lever and render the same inactive for a predetermined period to produce a thick stripe and the cam 130 which is actuated through the gear 127 from the controller will disengage the connector from the picker stick actuating mechanism in predetermined timed relation to produce thin stripes. This timing can be varied by rotatively adjusting the cam 130 upon its shaft so that a web comprising a thick stripe and a thin stripe with the normal weave alternating with the thick stripe and thin stripe will be produced, as illustrated in Fig. 5, or the thick and thin stripes may be brought together, as in Fig. 6, or produced in any desired relation.

The width of the thick stripe may be varied by adjustment of the shoe 43 of the hold-down. The width of the thin stripe may be varied by substituting cams 130 having recesses of different lengths or, of course, the cam 130 may be provided with means such as an adjustable shoe for varying the length of the recess 131 of the cam 130. By the adjustment of the length of the hold-down shoe 43 and the length of the recess in the cam 130, different widths of normal weave will be produced in the fabric in alternation with the thick and thin stripes A further adjustment in the normal weave can be made by the insertion of the pins in different pin holes 56 in the extension 54 of the link which connects the actuating arm of the rocker shaft 55 to the pawl actuating lever 48, thus causing the pawl to pass over one or more teeth of the ratchet upon the controller, thereby varying the speed of rotation of the controller and consequently varying the frequency of its cycles of rotation.

Figure 7:

The mechanism can be adapted to produce only thick stripes in the fabric (as illustrated in Fig. 7) by inserting the pin in the pin hole 146 in the bracket 143 to retain the connector for the picker stick permanently in engagement with the picker stick actuating arm 22.

The relative widths of thick stripe and normal weave may be varied in the manner above described. The density of the thick stripe can be determined, either when a thick stripe alone is produced or when alternating thick and thin stripes are produced, by adjustment of the let-back mechanism which is accomplished by the insertion of the pin 125 (see Fig. 3) in different pin slots in the arcuate arm 124.

Figure 8:

The mechanism can also be adjusted to produce only thin stripes (as illustrated in Fig. 8). This is accomplished by swinging the bracket 41 which is attached to and forms part of the harness lever about its pivot 42 into the dotted line position illustrated in Fig. 11, thereby permanently removing the roller 40 from the path of the hold-down 43 so that the action of the harness mechanism is not interrupted. In the production of the thin stripes the descent of the connector actuating lever 136 engages the plungers 148 and 172 and acts through the push wires to render the weft fork and the feeler inoperative thereby preventing stoppage or other undesirable change in the operation of the loom during the production of the thin stripe.

The entire controller mechanism can be rendered inoperative by the disengagement of the pawl 46 with the teeth of the hold-down ratchet 33 by raising the pawl and inserting the cotter pin 76 through the tail 73 of the pawl and the boss 74 upon the pawl actuating lever and then spreading the projecting legs of the cotter pin (see Fig. 12). This will result in eliminating entirely the action of the stripe-producing mechanism so that the loom will operate to produce continuously the predetermined normal weave.

Figure 9:
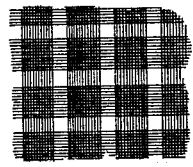
Figure 10:
Fig. 10 is a detail sectional view of the fabric illustrated in Fig. 5.

It will be obvious that by omitting a desired number of warps at selected predetermined intervals and by rendering the picker stick inactive by the mechanism herein described, a fabric such as that illustrated in Fig. 9 may be woven which will comprise crossing thin stripes extending at right angles to each other.

It will also be obvious that by massing of a desired number of warp threads and utilizing the hold-down mechanism above described a cross bar weave may be produced.

By combining such arrangements of the warps and by adjusting the relative operations of the hold-down and the mechanism for rendering the picker stick inactive, numerous patterns embodying thick and thin stripes can be readily woven upon a usual type of plain loom. When the invention is applied to a color or pattern loom, such modifications also may be made in connection with the design which the loom is normally adapted to produce.

It will be observed that the novel mechanism of the present invention is in effect a unit which can be applied to a usual type of loom by simply mounting the construction upon usual cross girders and loom side. This unit comprises the means for holding down the harness and the mechanism for rendering the picker stick inoperative with the various adjustments which enable such mechanism to introduce thick stripes and thin stripes into the normal weave of the fabric or to omit either the thick stripe or the thin stripe or both.

It will be understood that the particular embodiment of the invention disclosed herein is of an illustrative character and is not restrictive, and that various changes in construction and arrangement of parts may be made and that the invention may be embodied not only in plain looms, but in other types of looms within the spirit and scope of the claims.

Having thus described the invention, what is claimed as new, and desired to be secured by Letters Patent, is:

1. In a plain loom having weaving mechanism including cam operated shedding mechanism acting normally to produce a fabric having a predetermined weave, a rotatable controller having means selectively operable to cause said weaving mechanism to produce in said fabric thick stripes of accumulated weft or thin stripes by the omission of weft.

2. In a plain loom having weaving mechanism including cam operated shedding mechanism acting normally to produce a fabric having a predetermined weave, a rotatable controller and means operable thereby respectively to cause said weaving mechanism to produce in said fabric thick stripes of accumulated weft and thin stripes by the omission of weft in a predetermined sequence.

3. In a plain loom having weaving mechanism including cam operated shedding mechanism acting normally to produce a fabric having a predetermined weave, a rotatable controller and means operable thereby respectively to cause said weaving mechanism to produce in said fabric thick stripes of accumulated weft and thin stripes by the omission of weft in a predetermined sequence and means for rendering the thick stripe-producing means inoperative.

4. In a plain loom having weaving mechanism including cam operated shedding mechanism acting normally to produce a fabric having a predetermined weave, a rotatable controller and means operable thereby respectively to cause said weaving mechanism to produce in said fabric thick stripes of accumulated weft and thin stripes by the omission of weft in a predetermined sequence and means for rendering the thin stripe-producing means inoperative.

5. In a plain loom having weaving mechanism including cam operated shedding mechanism acting normally to produce a fabric having a predetermined weave, a rotatable controller and means operable thereby respectively to cause said weaving mechanism to produce in said fabric thick stripes of accumulated weft and thin stripes by the omission of weft and means for rendering said controller inoperative thereby to produce the normal weave.

6. In a plain loom having weaving mechanism including cam operated shedding mechanism acting normally to produce a fabric having a predetermined weave, a rotatable controller and means operable thereby to cause said weaving mechanism to produce in said fabric in sequence thick stripes of accumulated weft and thin stripes by the omission of weft and means for adjusting said controlling mechanism to vary the relative arrangement of the thick and thin stripes.

7. In a loom having weaving mechanism acting normally to produce a fabric having a predetermined weave, a rotatable controller and means operable thereby to cause said weaving mechanism to produce in said fabric thick stripes of accumulated weft and adjustable means on said controller operable to regulate the amount of let-back and thereby to vary the density of the thick stripes.

8. In a loom having weaving mechanism acting normally to produce a fabric having a predetermined weave, a rotatable controller and means operable thereby to cause said weaving mechanism to produce in said fabric in sequence thick stripes of accumulated weft and thin stripes by the omission of weft and extensible means on said controller for varying the number of accumulated weft threads producing the thick stripes.

9. In a plain loom having weaving mechanism including cam operated shedding mechanism acting normally to produce a fabric having a predetermined weave, a rotatable controller and means operable thereby to cause said weaving mechanism to produce in said fabric in sequence thick stripes of accumulated weft and thin stripes by the omission of weft and means on said controller adjustable to vary the relative widths of normal weave intermediate of the thick stripes and the thin stripes.

10. In a loom comprising a harness, a harness lever and a harness lever actuating cam, a rotatable controller having a hold-down rotatable therewith and operable to engage said harness lever when the latter is at the limit of its movement and to render said lever inoperative for a predetermined period.

11. In a loom comprising a harness, a harness lever and a harness lever actuating cam, a rotatable controller having a hold-down rotatable therewith and operable to engage said harness lever when the latter is at the limit of its movement and to render said lever inoperative for a predetermined period and adjustable means for changing the effective area of said hold-down to vary the period of its action upon said harness lever.

12. In a loom comprising a harness, a harness lever and a harness lever actuating cam, an intermittently rotatable controller having a hold-down operable to engage said harness lever when the latter is at the limit of its movement and to render said lever inoperative for a predetermined period and means operable in synchronized relation to said cam to advance said hold-down to operative position when the harness lever reaches the limit of its movement.

13. In a loom comprising a harness, a harness lever and a harness lever actuating cam, an intermittently rotatable controller having a hold-down operable to engage said harness lever when the latter is at the limit of its movement and to render said lever inoperative for a predetermined period, means operable in synchronized relation to said cam to advance said hold-down to operative position when the harness lever reaches the limit of its movement, and means for rotatably adjusting said hold-down to permit proper timing thereof relatively to said hold-down advancing means.

14. A loom comprising a harness, a harness lever and a shaft having a cam engaging said harness lever, an intermittently rotating controller having a hold-down to engage said harness lever when the latter is at a limit of its movement, a lever on said rotatable controller and means on said harness cam shaft in position to engage said controller lever and positively to advance said hold-down to operative position when the harness lever is at said limit of movement.

15. In a loom comprising a harness, a harness lever and a shaft having a cam engaging said harness lever, an intermittently rotated controller having a hold-down to engage said harness lever when the latter is at a limit of its movement, a lever on said rotatable controller, an arm on said harness cam shaft having means to engage said controller lever and advance said hold-down to operative position when the harness lever reaches said limit of movement and means for adjusting said controller-lever engaging means to vary the extent of its action upon said controller lever and thereby to vary the period of action of said hold-down.

16. In a loom comprising a harness, a harness lever and a shaft having a cam engaging said harness lever, an intermittently rotated controller having a hold-down to engage said harness lever when the latter is at a limit of its movement, a lever on said rotatable controller, an arm on said harness cam shaft having a stud to engage said controller lever and advance said hold-down to operative position when the harness lever reaches said limit of its movement and means for adjusting said stud radially of said arm to vary the extent of its action upon said controller lever.

17. In a loom comprising a harness, a harness lever and a shaft having a cam engaging said harness lever, an intermittently rotatable controller having a hold-down to engage said lever when the latter is at a limit of its movement, a spring-controlled lever pivotally mounted on said rotatable controller and capable of a limited movement and presenting a narrowly tapered end, an arm on said cam shaft positioned to engage said tapered lever when the harness lever reaches said limit of movement and to advance said hold-down to operative position.

18. In a loom comprising a harness, a harness lever and a shaft having a cam engaging said harness lever, a bracket having a follower mounted on said harness lever, a rotatable controller having a hold-down operable to engage said follower when the harness lever is at a limit of its movement and to retain said lever inactive for a predetermined period and means connecting said bracket to said harness lever adapted to permit the follower to be moved out of operative relation to said hold-down.

19. In a loom comprising a harness, a harness lever and a shaft having a cam engaging said harness lever, a bracket having a follower mounted on said harness lever, a rotatable controller having a hold-down operable to engage said follower when the harness lever is at a limit of its movement and to retain said lever inactive for a predetermined period and means pivotally connecting said bracket to said harness lever adapted to permit the follower to be swung out of operative relation to said hold-down.

20. In a loom comprising a harness, a harness lever and a harness lever actuating cam, a rotatable controller having a hold-down operable to engage said harness lever when the latter is at a limit of its movement, means for rotating said controller, means operable in synchronized relation to said cam to advance said hold-down to operative position when the harness lever reaches said limit of movement and means acting upon said controller to prevent overthrow.

21. In a loom comprising a harness, a harness lever and a harness lever-actuating cam, a rotatable controller having a hold-down operable to engage said harness lever when the latter is at a limit of its movement, means for rotating said controller, means operable in synchronized relation to said cam to advance said hold-down to operative position when the harness lever reaches said limit of movement and a brake acting upon said controller to prevent overthrow.

22. In a loom comprising a harness, a harness lever and a shaft having a harness lever actuating cam, a rotatable controller having a hold-down and provided with a ratchet, a spring pressed pawl engaging said ratchet, means for actuating said pawl to rotate said controller intermittently to cause said hold-down to engage said harness lever when the latter is at a limit of its movement and to hold said harness lever inactive for a predetermined period, and means for retaining said pawl out of engagement with said ratchet whereby rotation of said controller will be prevented.

23. In a loom comprising a harness, a harness lever and a shaft having a harness lever actuating cam, a rotatable controller having a hold-down and provided with a ratchet, a spring pressed pawl engaging said ratchet, means for actuating said pawl to rotate said controller intermittently to cause said hold-down to engage said harness lever when the latter is at a limit of its movement and to hold said harness lever inactive for a predetermined period, a positioning disk adjustably secured to said controller having recesses in its periphery complementary to said ratchet teeth and a spring-actuated latch engaging said periphery operable properly to position said rotatable member upon each movement thereof produced by said pawl.

24. In a loom comprising a harness, a harness lever and a shaft having a harness lever actuating cam, a rotatable controller having a hold-down and provided with a ratchet, a spring pressed pawl engaging said ratchet, means for actuating said pawl to rotate said controller intermittently to cause said hold-down to engage said harness lever when the latter is at a limit of its movement and to hold said harness lever inactive for a predetermined period, cooperating means upon said controller and said cam shaft operable to advance said hold-down into engagement with said harness lever when the latter has reached a limit of its movement, a positioning disk having recesses in its periphery complementary to the teeth of said ratchet including an extended recess to permit the advancing movement of said hold-down member and a spring actuated latch engaging the recessed periphery of the positioning disk.

25. In a loom comprising a harness, a harness lever and a shaft having a harness lever actuating cam, a rotatable controller having a hold-down and provided with a ratchet, a spring pressed pawl engaging said ratchet, means for actuating said pawl to rotate said controller intermittently to cause said hold-down to engage said harness lever when the latter is at a limit of its movement and to hold said harness lever inactive for a predetermined period, a brake drum connected to said controller having an external gear, a brake shoe engaging said brake drum, a shaft having a gear engaging said brake gear, a cam on said shaft and means operable by said cam to render the shuttle picking mechanism inoperative at predetermined intervals.

26. In a loom comprising a harness, a harness lever and a shaft having a harness lever actuating cam, a rotatable controller having a hold-down and provided with a ratchet, a spring pressed pawl engaging said ratchet, means for actuating said pawl to rotate said controller intermittently to cause said hold-down to engage said harness lever when the latter is at a limit of its movement and to hold said harness lever inactive for a predetermined period, a brake drum connected to said controller having an external gear, a brake shoe engaging said brake drum, a shaft having a gear engaging said brake gear, a cam on said shaft, means operable by said cam to render the shuttle picking mechanism inoperative at predetermined intervals, and manually operable means for releasing said brake from engagement with said brake drum to permit said hold-down member to be easily positioned.

27. In a loom having weaving mechanism acting normally to produce a fabric having a predetermined weave comprising shed-forming mechanism, a picker stick and picker stick actuating mechanism, means for retaining the shed-forming mechanism inactive with the shed open at predetermined intervals to produce thick stripes in said fabric, a connector for said picker stick and picker stick actuating mechanism movable into and out of operative relation thereto, and means operable in timed relation to the action of the means for rendering the shed-forming mechanism inactive for moving said connector out of operation to said picker stick actuating mechanism at predetermined intervals and for predetermined periods to produce thin stripes in said fabric.

28. In a loom having weaving mechanism acting normally to produce a fabric having a predetermined weave comprising shed-forming mechanism, a picker stick and picker stick actuating mechanism, means for retaining the shed-forming mechanism inactive with the shed open at predetermined intervals to produce thick stripes in said fabric, a connector for said picker stick and picker stick actuating mechanism movable into and out of operative relation thereto, and means for adjusting the timed relation of the means for retaining the shed-forming mechanism inactive and the means for rendering the picker stick inactive whereby the relation of the thick stripes and thin stripes to the normal weave may be varied.

29. In a loom having weaving mechanism acting normally to produce a fabric having a predetermined weave comprising shed-forming mechanism, a picker stick and picker stick actuating mechanism, means for retaining the shed-forming mechanism inactive with the shed open at predetermined intervals to produce thick stripes in said fabric, a connector for said picker stick and picker stick actuating mechanism movable into and out of operative relation thereto, a cam rotatable in timed relation to the action of the means for rendering the shed-forming mechanism inactive and means operable by said cam for moving said connector into and out of operative position.

30. In a loom having weaving mechanism acting normally to produce a fabric having a predetermined weave comprising shed-forming mechanism, a picker stick and picker stick actuating mechanism, means for retaining the shed-forming mechanism inactive with the shed open at predetermined intervals to produce thick stripes in said fabric, a connector secured to said picker stick movable into and out of engagement with said picker stick actuating mechanism comprising a block presenting a smooth lower face, a cam rotatable in timed relation to the action of the means for rendering the shed-forming mechanism inactive and means operable by said cam engaging the smooth face of said block to move said connector into and out of engagement with said picker stick actuating mechanism.

31. In a loom having weaving mechanism acting normally to produce a fabric having a predetermined weave comprising shed-forming mechanism, a picker stick and picker stick actuating mechanism, means for retaining the shed-forming mechanism inactive with the shed open at predetermined intervals to produce thick stripes in said fabric, a connector secured to said picker stick movable into and out of engagement with said picker stick actuating mechanism comprising a block presenting a smooth lower face, a cam rotatable in timed relation to the action of the mechanism for rendering the shed-forming mechanism inactive and a lever operable by said cam having a leaf spring engaging the smooth face of said connector block.

32. In a loom having weaving mechanism action normally to produce a predetermined weave and having filling replenishing mechanism, and detector mechanism for actuating the same upon detection of substantial exhaustion of filling upon the filling carrier, shuttle actuating means, means for rendering the shuttle actuating mechanism inoperative at predetermined intervals to produce a thin stripe in the fabric and means operable thereby to prevent filling replenishment during the production of said thin stripe.

33. In a loom having weaving mechanism acting normally to produce a predetermined weave and having filling replenishing mechanism and detector mechanism for actuating the same upon detection of substantial exhaustion of filling upon the filling carrier and shuttle actuating mechanism including a picker stick, picker stick actuating means and a connector secured to said picker stick disengageably connected to said picker stick actuating means, means for moving said connector into and out of engagement with said picker stick actuating means at predetermined intervals to produce a thin stripe in the fabric and means operable thereby to prevent filling replenishment.

34. In a loom having weaving mechanism acting normally to produce a fabric having a predetermined weave comprising a feeler and means operable thereby upon detection of absence or failure of filling to effect a change in the operation of the loom and shuttle actuating mechanism including a picker stick, picker stick actuating means and a connector secured to said picker stick disengageably connected to said picker stick actuating means, means for moving said connector into and out of engagement with said picker stick actuating means at predetermined intervals to produce a thin stripe in the fabric and plunger mechanism operable by said connector directly to engage said feeler and render said feeler inoperative during the disengagement of the picker stick actuating means.

35. In a loom having weaving mechanism acting normally to produce a fabric having a predetermined weave comprising a weft fork and means operable thereby upon detection of absence or failure of filling to effect a stoppage of the loom and shuttle actuating mechanism including a picker stick, picker stick actuating means and a connector secured to said picker stick disengageably connected to said picker stick actuating means, means for moving said connector into and out of engagement with said picker stick actuating means at predetermined intervals to produce a thin stripe in the fabric and plunger mechanism operable by said connector directly to engage and tilt said weft fork to inoperative position during the disengagement of said picker stick actuating means.

36. In a loom having weaving mechanism acting normally to produce a fabric having a predetermined weave, comprising a feeler and a weft fork and means operable respectively thereby upon substantial exhaustion of filling on the filling carrier or of failure of filling to effect a change in the operation of the loom and shuttle actuating mechanism, means for rendering said shuttle actuating mechanism inoperative at predetermined intervals to produce a thin stripe in the fabric and means operable thereby respectively to prevent a change in the operation of the loom by said feeler mechanism and by said weft fork mechanism during the production of said thin stripe.

37. In a loom having weaving mechanism acting normally to produce a fabric having a predetermined weave comprising a feeler and a weft fork and means operable respectively thereby upon detection of substantial exhaustion of filling on the filling carrier, or of failure of filling, to effect a change in the operation of the loom and shuttle actuating mechanism including a picker stick, picker stick actuating means and a connector secured to said picker stick disengageably connected to said picker stick actuating means, means for moving said connector into and out of engagement with said picker stick actuating means at predetermined intervals to produce a thin stripe in the fabric and means respectively operable thereby to render said feeler and weft fork inoperative during the disengagement of said picker stick actuating means.

38. In a loom having weaving mechanism acting normally to produce a fabric having a predetermined weave comprising a feeler and means operable thereby upon detection of substantial exhaustion of filling on the filling carrier, or of failure of filling, to effect a change in the operation of the loom and shuttle actuating mechanism including a picker stick, picker stick actuating means and a connector secured to said picker stick disengageably connected to said picker stick actuating means, a lever engaging said connector, a cam acting at predetermined intervals to cause disengagement of said connector and said picker stick actuating means to produce a thin stripe in the fabric and a push wire operable by said lever when moved to connector-disengaging position having means to engage said feeler and render the same inoperative during the disengagement of said picker stick actuating means.

39. In a loom having weaving mechanism acting normally to produce a fabric having a predetermined weave comprising a weft fork and means operable thereby upon detection of absence or failure of filling to effect a change in the operation of the loom and shuttle actuating mechanism including a picker stick, picker stick actuating means and a connector secured to said picker stick disengageably connected to said picker stick actuating means, a lever engaging said connector, a cam acting at predetermined intervals to cause disengagement of said connector and said picker stick actuating means to produce a thin stripe in the fabric and a push wire operable by said lever when moved to connector-disengaging position having means to engage said weft fork and render the same inoperative during the disengagement of said picker stick actuating means.

40. In a loom having weaving mechanism acting normally to produce a fabric having a predetermined weave comprising a feeler, a weft fork and means operable thereby respectively upon detection of substantial exhaustion of filling on the filling carrier, and absence or failure of filling to effect a change in the operation of the loom and shuttle actuating mechanism including a picker stick, picker stick actuating means and a connector secured to said picker stick disengageably connected to said picker stick actuating means, a lever engaging said connector, a cam acting at predetermined intervals to cause disengagement of said connector and said picker stick actuating means to produce a thin stripe in the fabric, push wires operable by said lever when moved to connector disengaging position having means respectively to engage said feeler and said weft fork and to render the same inoperative during the disengagement of said picker stick actuating means.

41. In a loom having a weaving mechanism acting normally to produce a fabric having a predetermined weave comprising a picker stick, picker stick actuating means, and a connector secured to said picker stick disengageably connected to said picker stick actuating means, a lever engaging said connector, a cam acting at predetermined intervals upon said lever to cause disengagement of said connector and said picker stick actuating means to produce a thin stripe in the fabric, a guide for the free end of said lever and a guard upon said connector embracing said lever operable to insure actuation of said connector by said lever and so prevent lateral and transverse misalignment of said connector.

42. In a loom having weaving mechanism acting normally to produce a fabric having a predetermined weave comprising a picker stick, picker stick actuating means, and a connector secured to said picker stick disengageably connected to said picker stick actuating means, a lever engaging said connector, a cam acting at predetermined intervals upon said lever to cause disengagement of said connector and said picker stick actuating means to produce a thin stripe in the fabric, a guide for the free end of said lever and means selectively operable to retain the free end of said lever in said guide in a position to retain said connector in operative relation with respect to said picker stick and picker stick actuating means.

43. In a loom having weaving mechanism operable to produce a fabric having a predetermined weave comprising shed-forming mechanism and controlling mechanism operable at predetermined intervals to retain the shed in open position for a predetermined period to receive and accumulate a plurality of wefts to form a thick stripe in the fabric, let-back mechanism and means operable by said controlling mechanism to actuate said let-back mechanism, and means for adjusting the range of movement of said let-back mechanism whereby the density of the thick stripe may be regulated.

44. In a loom having weaving mechanism operable to produce a fabric having a predetermined weave comprising a harness, a harness lever, a harness lever actuating cam and a take-up roll, an intermittently rotatable controller having a hold-down operable in timed relation to said cam to engage said harness lever when the latter is at a limit of its movement to render said lever inoperative for a predetermined period and thereby to produce a thick stripe and means automatically operable by said controller to let back said take-up roll a predetermined amount and thereby cause massing of the accumulated wefts forming the thick stripe.

45. In a loom having weaving mechanism operable to produce a fabric having a predetermined weave comprising a harness, a harness lever, a harness lever actuating cam and a take-up roll, an intermittently rotatable controller having a hold-down operable in timed relation to said cam to engage said harness lever when the latter is at a limit of its movement to render said lever inoperative for a predetermined period and thereby to produce a thick stripe and means automatically operable by said controller to let back said take-up roll a predetermined amount and thereby cause massing of the accumulated wefts forming the thick stripe, and means for adjusting a range of let-back movement.

46. In a loom having weaving mechanism acting normally to produce a fabric having a predetermined weave comprising a harness, a harness lever, a harness lever actuating cam and a take-up roll, an actuating shaft for said take-up, a clutch member slidably connected to said shaft, a gear on said shaft having a complementary clutch member, means operable by said gear to rotate said take-up roll, a ratchet connected to said gear, a detent pawl engaging said ratchet having a predetermined let-back movement, an intermittently rotatable controller having a hold-down operable in timed relation to said cam to engage said harness lever when the latter is at a limit of its movement to render said lever inoperative for a predetermined period and thereby produce a thick stripe, a cam on said controller and means operable by said controller cam to release said slidable clutch member and thereby to cause let-back movement of said take-up roll.

47. In a loom comprising a harness, a harness lever and a harness lever actuating cam, a rotatable controller having a hold-down operable to engage said harness lever when the latter is at a limit of its movement and render said lever inoperative for a predetermined period, a ratchet disk on said controller, a pawl engaging said ratchet, means for actuating said pawl and means for adjusting the effective amplitude of movement of said pawl actuating means to vary the frequency of the cycles of rotation of said controller and thereby to vary the width of the thick stripes and of the normal weave therebetween.

48. In a loom comprising a picker stick, picker stick actuating means and a connector disengageably connecting said picker stick and said picker stick actuating mechanism and comprising a harness lever, a harness lever actuating cam, a rotatable controller having a hold-down operable to engage said harness lever when the latter is at a limit of its movement and to render said lever inoperative for a predetermined period, means operable by said controller in timed relation to said hold-down to disengage said connector from said picker stick actuating mechanism, a ratchet disk on said controller, a pawl engaging the ratchet, means for actuating said pawl and means for adjusting the effective amplitude of movement of said pawl actuating means to vary the frequency of the cycles of rotation of said controller and thereby to vary the width of the thick stripes and of the thin stripes and of the normal weave.

49. A controller unit for looms comprising a shaft having supporting members removably secured to a usual loom frame, a controller mounted on said shaft having a hold-down member operable to engage the harness lever of the loom when the latter is at a limit of its movement and render the same inactive for a predetermined period and means for rotating said controller adapted to be connected to a moving part of the loom.

50. A controller unit for looms comprising a shaft having supporting members removably secured to a usual loom frame, a controller mounted on said shaft having a hold-down member operable to engage the harness lever of the loom when the latter is at a limit of its movement and render the same inactive for a predetermined period, means for rotating said controller adapted to be connected to a moving part of the loom and means for arresting the action of the picker stick at predetermined intervals and for predetermined periods.

51. A controller unit for looms comprising a shaft having supporting members removably secured to a usual loom frame, a controller mounted on said shaft having a hold-down member operable to engage the harness lever of the loom when the latter is at a limit of its movement and render the same inactive for a predetermined period, means for rotating said controller adapted to be connected to a moving part of the loom, and means for rendering the action of the hold-down inoperative.

52. A controller unit for looms comprising a shaft having supporting members removably secured to a usual loom frame, a controller mounted on said shaft having a hold-down member operable to engage the harness lever of the loom when the latter is at a limit of its movement and render the same inactive for a predetermined period, means for rotating said controller adapted to be connected to a moving part of the loom, means for arresting the action of the picker stick at predetermined intervals and for predetermined periods, and means for rendering the picker stick arresting mechanism inoperative.

53. A controller unit for looms comprising a shaft having supporting members removably secured to a usual loom frame, a controller mounted on said shaft having a hold-down member operable to engage the harness lever of the loom when the latter is at a limit of its movement and render the same inactive for a predetermined period, means for rotating said controller adapted to be connected to a moving part of the loom, means for arresting the action of the picker stick at predetermined intervals and for predetermined periods, and means for preventing the rotation of the controller.

In testimony whereof, I have signed my name to this specification.

WILLIAM SEVILLE.